US012112679B2

(12) United States Patent
Park et al.

(10) Patent No.: US 12,112,679 B2
(45) Date of Patent: Oct. 8, 2024

(54) DISPLAY DEVICE FOR REDUCING DIFFERENCE IN BRIGHTNESS AMONG SUBFRAMES OF LIGHT EMITTING ELEMENTS FORMING ONE GROUP

(71) Applicant: TLI Inc., Seongnam-si (KR)

(72) Inventors: Ju Hyun Park, Suwon-si (KR); Hwi Jeong Jo, Seoul (KR)

(73) Assignee: TLI INC., Seongnam-si (KR)

( * ) Notice: Subject to any disclaimer, the term of this patent is extended or adjusted under 35 U.S.C. 154(b) by 0 days.

(21) Appl. No.: 18/471,085

(22) Filed: Sep. 20, 2023

(65) Prior Publication Data

US 2024/0212556 A1 Jun. 27, 2024

(30) Foreign Application Priority Data

Dec. 22, 2022 (KR) ........................ 10-2022-0181256

(51) Int. Cl.
*G09G 3/20* (2006.01)

(52) U.S. Cl.
CPC ... *G09G 3/2022* (2013.01); *G09G 2310/0264* (2013.01); *G09G 2320/0233* (2013.01)

(58) Field of Classification Search
CPC ......... G09G 3/2022; G09G 2310/0264; G09G 2320/0233
See application file for complete search history.

(56) References Cited

U.S. PATENT DOCUMENTS 8,941,558 B2 1/2015 Park et al.
2022/0415245 A1 12/2022 Lee et al.
2024/0098858 A1 * 3/2024 Park ....................... H05B 45/59

FOREIGN PATENT DOCUMENTS

KR 10-0850498 8/2008
KR 10-2199942 1/2021
KR 20220155243 A * 11/2022

* cited by examiner

*Primary Examiner* — Stacy Khoo
(74) *Attorney, Agent, or Firm* — KILE PARK REED & HOUTTEMAN PLLC

(57) ABSTRACT

A display device includes a display panel including light emitting elements, scan lines, and channel lines, a scan driving part that transmits current to the channel lines, a data storage part that stores display data, and a pulse width modulating part that generates modulating signals.

7 Claims, 4 Drawing Sheets

DISPLAY DEVICE FOR REDUCING DIFFERENCE IN BRIGHTNESS AMONG SUBFRAMES OF LIGHT EMITTING ELEMENTS FORMING ONE GROUP

CROSS-REFERENCE TO RELATED APPLICATION

This application claims priority to and the benefits of Korean Patent Application No. 2022-0181256 under 35 U.S.C. § 119, filed on Dec. 22, 2022, in the Korean Intellectual Property Office (KIPO), the entire contents of which are incorporated herein by reference.

BACKGROUND

1. Technical Field

The disclosure relates to a display device for reducing difference in brightness among subframes of light emitting elements forming one group.

2. Description of the Related Art

Display devices such as LED displays include light emitting elements such as LEDs. The light emitting element emits light with brightness according to the data value of the corresponding display data. Brightness corresponds to luminous energy, which is the energy of light, and is a function of luminous intensity and luminous time.

As a brightness control method of a display device, 'pulse width modulation (PWM) driving method' is widely used. In the PWM driving method, one unit frame is divided into a plurality of subframes. Each of the plurality of subframes includes a plurality of unit times. The number of unit times, in which the modulation signal is activated, is adjusted according to the data value of the display data.

According to the PWM driving method, the data value of the display data of the light emitting element is modulated as the sum of the activation widths of the modulation signal. The light emitting element emits light while maintaining a constant luminous intensity during the activation of the modulation signal.

However, the number of unit times in which the modulation signal is activated may be different among subframes, when the display data of the light emitting device has a special data value.

In case that the display data of the light emitting device has a special data value, a difference in brightness of the displayed image among subframes may occur, and a flicker phenomenon may occur in the displayed image.

SUMMARY

The disclosure is directed to a display device for reducing difference in brightness among subframes of light emitting elements forming one group.

According to an embodiment of the disclosure, there is provided a display device.

The display device according to an embodiment of the disclosure may include a display panel including a 1-st to a 4-th light emitting element forming one group, a 1-st scan line and a 2-nd scan line adjacent to each other and a 1-st channel line and a 2-nd channel line adjacent to each other, wherein the 1-st light emitting element may be connected to the 1-st scan line and the 1-st channel line, the 2-nd light emitting element may be connected to the 1-st scan line and the 2-nd channel line, the 3-rd light emitting element may be connected to the 2-nd scan line and the 1-st channel line, and the 4-th light emitting element may be connected to the 2-nd scan line and the 2-nd channel line, each of the 1-st to the 4-th light emitting element may emit light with brightness according to a total amount of current flowing therein during a unit frame, the unit frame may include a 1-st to an n-th subframe which are sequentially progressed, and each of the 1-st to the n-th subframe may include 'p' number of a unit time, 'n' may be a natural number greater than or equal to 2, and 'p' may be a natural number greater than or equal to 1; a scan driving part that is driven to selectively activate the 1-st scan line and the 2-nd scan line according to a scan address which is sequentially changed, wherein the 1-st scan line and the 2-nd scan line may be activated non-overlappingly and sequentially in each of the 1-st to the n-th subframe; a channel driving part that is driven to transmit current to flow in the 1-st channel line and the 2-nd channel line for a time corresponding to an activation width of a 1-st modulation signal and an activation width of a 2-nd modulation signal; a data storage part that stores a 1-st to a 4-th display data corresponding to the 1-st to the 4-th light emitting device, wherein the 1-st display data and the 2-nd display data may be sequentially output together with a channel address specifying corresponding 1-st and 2-nd channel line according to a generation of a 1-st scan address which is the scan address specifying the 1-st scan line, and the 3-rd display data and the 4-th display data are sequentially output together with a channel address specifying corresponding 1-st and 2-nd channel line according to a generation of a 2-nd scan address which is the scan address specifying the 2-nd scan line; and a pulse width modulating part that is driven to generate a 1-st modulating signal and a 2-nd modulating signal by modulating the 1-st display data and the 2-nd display data provided from the data storage part according to the generation of the 1-st scan address, wherein the 1-st modulation signal may be activated in the 1-st to the n-th subframe with an activation width corresponding to a 1-st distribution pattern of the 1-st display data in case that the 1-st scan address is generated, and the 2-nd modulation signal may be activated in the 1-st to the n-th subframe with an activation width corresponding to a 2-nd distribution pattern of the 2-nd display data in case that the 1-st scan address is generated. The activation width of the 1-st modulation signal and the activation width of the 2-nd modulation signal may be different from each other with respect to the 1-st display data and the 2-nd display data having a specific data value in a specific subframe that is at least one of the 1-st to the n-th subframe in case that the 1-st scan address is generated.

With respect to the 1-st display data and the 2-nd display data having the specific data value in the specific subframe that is at least one of the 1-st to the n-th subframe in case that the 1-st scan address is generated, the activation width of the 1-st modulation signal may correspond to 'a' number of the unit time, the activation width of the 2-nd modulation signal may correspond to 'a+r' number of the unit time, 'a' may be an integer in a range of 0 to (p-1), and 'r' may be a natural number greater than or equal to 1.

The pulse width modulating part may be driven to generate the 1-st modulating signal and the 2-nd modulating signal by modulating the 3-rd display data and the 4-th display data provided from the data storage part according to the generation of the 2-nd scan address, the 1-st modulating signal may be activated in the 1-st to the n-th subframe with an activation width corresponding to the 2-nd distribution pattern of the 3-rd display data in case that the 2-nd address is generated, the 2-nd modulating signal may be activated in the 1-st to the n-th subframe with an activation width corresponding to the 1-st distribution pattern of the 4-th display data in case that the 2-nd address is generated, and the activation width of the 1-st modulation signal and the activation width of the 2-nd modulation signal may be different from each other with respect to the 3-rd display data and the 4-th display data having the specific data value in the specific subframe in case that the 2-nd scan address is generated.

With respect to the 3-rd display data and the 4-th display data having the specific data value in the specific subframe when the 2-nd scan address is generated, the activation width of the 1-st modulation signal may correspond to ‘a+r’ number of the unit time, and the activation width of the 2-nd modulation signal may correspond to ‘a’ number of the unit time.

The channel driving part may include a 1-st channel driving unit for driving the 1-st channel line with an amount of current corresponding to the activation width of the 1-st modulation signal, and a 2-nd channel driving unit for driving the 2-nd channel line with an amount of current corresponding to the activation width of the 2-nd modulation signal.

The data storage part may include a SRAM that stores the 1-st to the 4-th display data provided from an outside.

The pulse width modulating part may include a sub-counting unit that is driven to generate a sub-counting information, wherein the 1-st to the n-th subframe in the unit frame may be distinguished by the sub-counting information, a 1-st distribution unit that is driven to generate a 1-st to an n-th distribution data of a 1-st distribution type for the 1-st to the n-th subframe, wherein data values of the 1-st to the n-th distribution data of the 1-st distribution type may depend on the 1-st distribution pattern with respect to the 1-st to the 4-th display data, a 2-nd distribution unit that is driven to generate a 1-st to an n-th distribution data of a 2-nd distribution type for the 1-st to the n-th subframe, wherein data values of the 1-st to the n-th distribution data of the 2-nd distribution type may depend on the 2-nd distribution pattern with respect to the 1-st to the 4-th display data, a multiplexer that is driven to provide a 1-st to an n-th selection data for the 1-st to 4-th display data, wherein an i-th selection data may be selected according to a channel address between an i-th distribution data of the 1-st distribution type and an i-th distribution data of the 2-nd distribution type, and ‘i’ is a natural number between 1 and n, a latch generation unit that generates a 1-st latch signal and a 2-nd latch signal, wherein the 1-st latch signal may be activated in response to a generation of a 1-st channel address that is a channel address specifying the 1-st channel line, and the 2-nd latch signal may be activated in response to a generation of a 2-nd channel address that is a channel address specifying the 2-nd channel line, a 1-st modulation unit that is driven to generate the 1-st modulation signal with latching and modifying the 1-st to the n-th selection data according to activation of the 1-st latch signal, wherein the activation widths of the 1-st modulation signal in the 1-st to the n-th subframe may correspond to data values of the 1-st to the n-th selection data, and a 2-nd modulation unit that is driven to generate the 2-nd modulation signal with latching and modifying the 1-st to the n-th selection data according to activation of the 2-nd latch signal, wherein the activation widths of the 2-nd modulation signal in the 1-st to the n-th subframe may correspond to data values of the 1-st to the n-th selection data.

The multiplexer may be driven to provide the 1-st to the n-th selection data together with the channel address and the scan address.

According to an embodiment of the disclosure, there is also provided a display device.

The display device according to an embodiment of the disclosure may include a display panel including a 1-st to a 4-th light emitting element forming one group, a 1-st scan line and a 2-nd scan line adjacent to each other and a 1-st channel line and a 2-nd channel line adjacent to each other, wherein the 1-st light emitting element may be connected to the 1-st scan line and the 1-st channel line, the 2-nd light emitting element may be connected to the 1-st scan line and the 2-nd channel line, the 3-rd light emitting element may be connected to the 2-nd scan line and the 1-st channel line, and the 4-th light emitting element may be connected to the 2-nd scan line and the 2-nd channel line, each of the 1-st to the 4-th light emitting element may emit light with brightness according to a total amount of current flowing therein during a unit frame, the unit frame may include a 1-st to an n-th subframe which are sequentially progressed, and each of the 1-st to the n-th subframe may include ‘p’ number of a unit time, ‘n’ may be a natural number greater than or equal to 2, and ‘p’ may be a natural number greater than or equal to 1; a scan driving part that is driven to selectively activate the 1-st scan line and the 2-nd scan line according to a scan address which is sequentially changed, wherein the 1-st scan line and the 2-nd scan line may be activated non-overlappingly and sequentially in each of the 1-st to the n-th subframe; a channel driving part that is driven to transmit current to flow in the 1-st channel line and the 2-nd channel line for a time corresponding to an activation width of a 1-st modulation signal and an activation width of a 2-nd modulation signal; a data storage part that stores a 1-st to a 4-th display data corresponding to the 1-st to the 4-th light emitting device, wherein the 1-st display data and the 2-nd display data may be sequentially output together with a channel address specifying corresponding 1-st and 2-nd channel line according to a generation of a 1-st scan address which is the scan address specifying the 1-st scan line, and the 3-rd display data and the 4-th display data may be sequentially output together with a channel address specifying corresponding 1-st and 2-nd channel line according to a generation of a 2-nd scan address which is the scan address specifying the 2-nd scan line; and a pulse width modulating part that is driven to generate a 1-st modulating signal and a 2-nd modulating signal by modulating the 1-st display data and the 2-nd display data provided from the data storage part according to the generation of the 1-st scan address, and generate the 1-st modulating signal and the 2-nd modulating signal by modulating the 3-rd display data and the 4-th display data provided from the data storage part according to the generation of the 2-nd scan address. The 1-st modulation signal may be activated in the 1-st to the n-th subframe with the activation width corresponding to a 1-st distribution pattern of the 1-st display data in case that the 1-st scan address is generated, and the activation width corresponding to a 2-nd distribution pattern of the 3-rd display data in case that the 2-nd scan address is generated. The activation width of the 1-st modulation signal in case that the 1-st scan address is generated and the activation width of the 1-st modulation signal in case that the 2-nd scan address is generated may be different from each other with respect to the 1-st display data and the 3-rd display data having a specific data value in a specific subframe that is at least one of the 1-st to the n-th subframe.

The activation width of the 1-st modulation signal may correspond to 'a' number of the unit time with respect to the 1-st display data having the specific data value in the specific subframe in case that the 1-st scan address is generated, the activation width of the 1-st modulation signal may correspond to 'a+r' number of the unit time with respect to the 3-rd display data having the specific data value in the specific subframe in case that the 2-nd scan address is generated, 'a' may be an integer in a range of 0 to (p-1), and 'r' may be a natural number greater than or equal to 1.

In the display device of the disclosure configured as described above, a brightness difference among subframes of light emitting devices forming one group is reduced. As a result, according to the display device of the disclosure, the flicker phenomenon is alleviated.

BRIEF DESCRIPTION OF THE DRAWINGS

The above and other objects, features and advantages of the disclosure will become more apparent to those skilled in the art by describing in detail embodiments thereof with reference to the accompanying drawings, in which.

DETAILED DESCRIPTION OF THE EMBODIMENTS

Embodiments of the disclosure will be described in detail below with reference to the accompanying drawings. While the disclosure is shown and described in connection with embodiments thereof, it will be apparent to those skilled in the art that various modifications can be made without departing from the spirit and scope of the disclosure. Thus, the scope of the disclosure is not limited to these particular following embodiments.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements.

For the purposes of this disclosure, "at least one of A and B" may be construed as A only, B only, or any combination of A and B. Also, "at least one of X, Y, and Z" and "at least one selected from the group consisting of X, Y, and Z" may be construed as X only. Y only, Z only, or any combination of two or more of X, Y, and Z. As used herein, the term "and/or" includes any and all combinations of one or more of the associated listed items.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiment of the disclosure will be described in detail with reference to the accompanying drawings.

Figure 1:
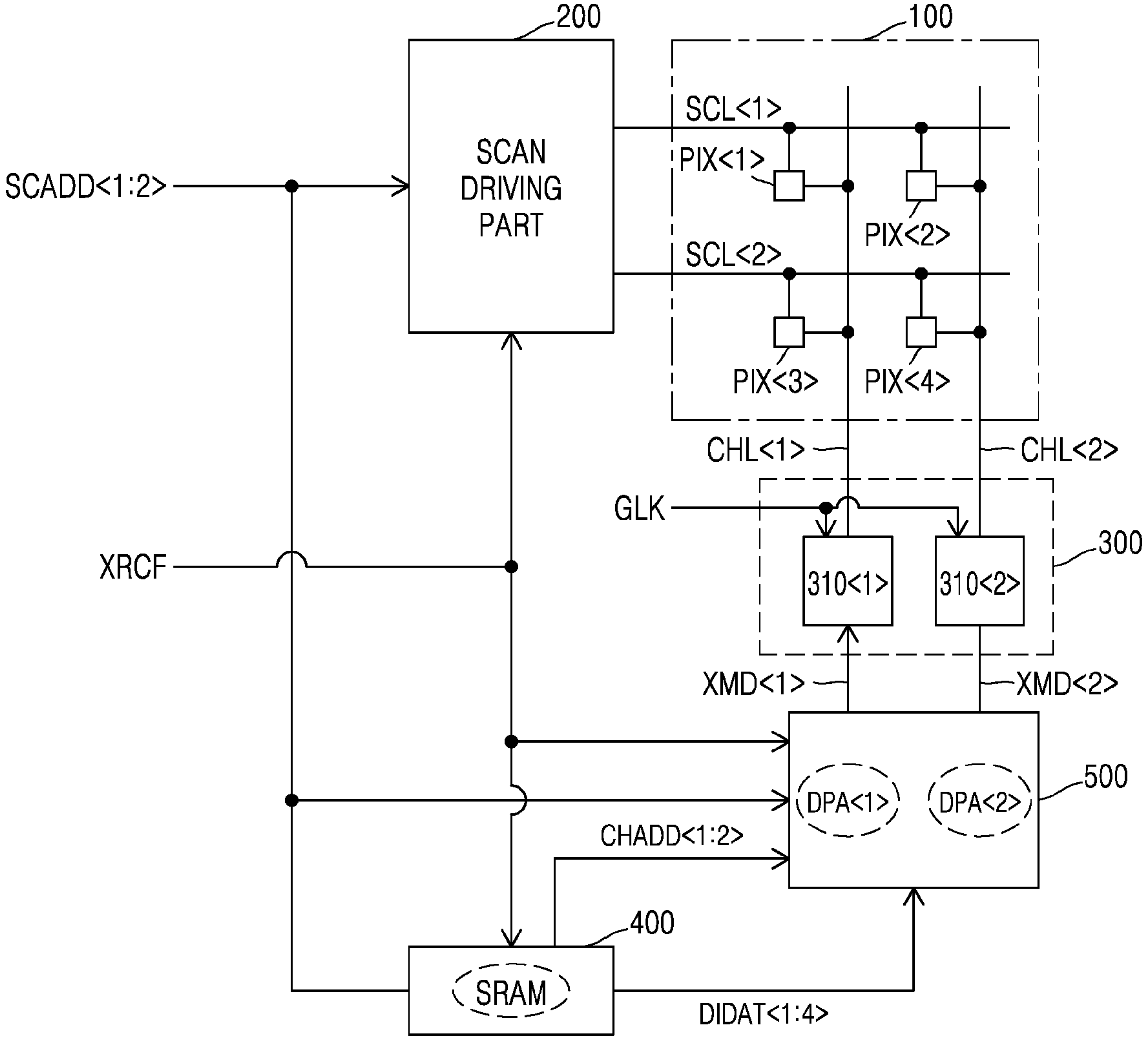
FIG. 1 is a schematic diagram of a display device according to an embodiment of the disclosure.

FIG. 1 is a schematic diagram of a display device according to an embodiment of the disclosure. Referring to FIG. 1, the display device of the disclosure may include a display panel 100, a scan driving part 200, a channel driving part 300, a data storage part 400 and a pulse width modulating part 500.

Operation timings of the scan driving part 200, the channel driving part 300, the data storage part 400 and the pulse width modulating part 500 may be controlled by a reference timing signal XRCF. Accordingly, the scan driving part 200, the channel driving part 300, the data storage part 400 and the pulse width modulating part 500 may be operated with an appropriate timing.

In an embodiment, the display panel 100 may include a 1-st to a 4-th light emitting element PIX<1:4>, a 1-st scan line SCL<1>, a 2-nd scan line SCL<2>, a 1-st channel line CHL<1> and a 2-nd channel line CHL<2>. In an embodiment, the display panel 100 may include multiple light emitting elements PIX specified by a corresponding scan line SL and a corresponding data line DL. FIG. 1 illustrates the 1-st to the 4-th light emitting element PIX<1:4>, which can be implemented as LEDs, for simplicity of description. However, the disclosure is not limited thereto.

The 1-st scan line SCL<1> and the 2-nd scan line SCL<2> may be arranged adjacent to each other, and the 1-st channel line CHL<1> and the 2-nd channel line CHL<2> may be arranged adjacent to each other.

The 1-st light emitting element PIX<1> may be connected to the 1-st scan line SCL<1> and the 1-st channel line CHL<1>. The 2-nd light emitting element PIX<2> may be connected to the 1-st scan line SCL<1> and the 2-nd channel line CHL<2>. The 3-rd light emitting element PIX<3> may be connected to the 2-nd scan line SCL<2> and the 1-st channel line CHL<1>. The 4-th light emitting element PIX<4> may be connected to the 2-nd scan line SCL<3> and the 2-nd channel line CHL<2>.

Two adjacent light emitting elements PIX may constitute one group. In another embodiment, all of the 1-st to the 4-th light emitting element PIX<1:4> may constitute one group.

Each of the 1-st to the 4-th light emitting element PIX<1:4> may emit light with brightness according to the total amount of current flowing therein during a unit frame UFR. See FIG. 3. The unit frame UFR may be a time period in which each of the 1-st to the 4-th light emitting element PIX<1:4> emits light with brightness according to the data value of the corresponding 1-st to 4-th display data DIDAT<1:4> (See FIG. 2) to display one unit image. 'n' may be a natural number greater than or equal to 2.

The unit frame UFR may include a 1-st to an n-th subframe which are sequentially progressed. ‘n’ may be a natural number greater than or equal to 2. In the specification, an embodiment that ‘n’ is 8 is described. For example, the unit frame UFR may include a 1-st to an 8-th subframe SFR_1 to SFR_8 which are sequentially progressed.

Each of the 1-st to an 8-th subframe SFR_1 to SFR_8 may include ‘p’ number of unit times UTM. See FIG. 3. ‘p’ may be a natural number greater than or equal to 1.

In the specification, an embodiment that ‘p’ is 8 is described. In an embodiment, each of the 1-st to an 8-th subframe SFR_1 to SFR_8 may include 4' unit times UTM.

Accordingly, in an embodiment, 1 unit frame UFR may include 32 unit times UTM. The unit time UTM may correspond to the unit data value of the 1-st to the 4-th display data DIDAT<1:4>. In an embodiment, the unit data value of the 1-st to the 4-th display data DIDAT<1:4> may be 1.

As a result, the depth of each of the 1-st to the 4-th display data DIDAT<1:4> may be in a range of 1 to 32. The depth of the display data DIDAT may be the number of data values that may be represented by the display data DIDAT.

The unit time UTM may correspond to the unit data value of the 1-st to the 4-th display data DIDAT<1:4> and may be set based on 1 cycle, ½ cycle, 2 cycles, etc. of the clock signal CLK.

The scan driving part 200 may be driven to selectively activate the 1-st scan line SCL<1> and the 2-nd scan line SCL<2> according to a scan address SCADD. The scan address SCADD may be sequentially changed.

In an embodiment, the scan address SCADD may include a 1-st scan address SCADD<1> and a 2-nd scan address SCADD<2>. The 1-st scan address SCADD<1> and the 2-nd scan address SCADD<2> may be generated non-overlappingly and sequentially in each of the 1-st to the 8-th subframe SFR_1 to SFR_8.

The 1-st scan address SCADD<1> may be a scan address SCADD specifying the 1-st scan line SCL<1>, and the 2-nd scan address SCADD<2> may be a scan address SCADD specifying the 2-nd scan line SCL<2>.

As a result, the 1-st scan line SCL<1> and the 2-nd scan line SCL<2> may be activated non-overlappingly and sequentially in each of the 1-st to the 8-th subframe SFR_1 to SFR_8.

Those skilled in the art may readily implement the scan driving part 200. Therefore, in this specification, a detailed description thereof is omitted.

The channel driving part 300 may be driven to transmit current to flow in the 1-st channel line CHL<1> and the 2-nd channel line CHL<2> for a time corresponding to activation width of a 1-st modulation signal XMD<1> and activation width of a 2-nd modulation signal XMD<2>.

In an embodiment, the channel driving part 300 may include a 1-st channel driving unit 310<1> and a 2-nd channel driving unit 310<2>.

The 1-st channel driving unit 310<1> may drive the 1-st channel line CHL<1> with an amount of current corresponding to an activation width of the 1-st modulation signal XMD<1>, and the 2-nd channel driving unit 310<2> may drive the 2-nd channel line CHL<2> with an amount of current corresponding to an activation width of the 2-nd modulation signal XMD<2>.

Those skilled in the art may readily implement the 1-st channel driving unit 310<1> and the 2-nd channel driving unit 310<2>. Therefore, in this specification, a detailed description thereof is omitted.

The data storage part 400 may store a 1-st to a 4-th display data DIDAT<1:4>. The 1-st to the 4-th display data DIDAT<1:4> may correspond to the 1-st to the 4-th light emitting device PIX<1:4>, respectively, and the first to fourth display data DIDAT<1:4> may be provided from an external system or generated internally.

In an embodiment, the data storage part 400 may include a SRAM to store the 1-st to the 4-th display data DIDAT<1:4> which are provided from an outside The data storage part 400 may be driven to sequentially output the 1-st display data DIDAT<1> and the 2-nd display data DIDAT<2> together with a 1-st channel address CHADD<1> and a 2-nd channel address CHADD<2>, respectively, in case that the 1-st scan address SCADD<1> is generated. See t11 in FIG. 3.

The 1-st channel address CHADD<1> may be a channel address CHADD specifying the 1-st channel line CHL<1>, and the 2-nd channel address CHADD<2> may be a channel address CHADD specifying the 2-nd channel line CHL<2>.

For example, in case that the 1-st scan address SCADD<1> is generated, the data storage part 400 may be driven to first output the 1-st display data DIDAT<1> together with the 1-st channel address CHADD<1>. Subsequently, the data storage part 400 may output the 2-nd display data DIDAT<2> together with the 2-nd channel address CHADD<2>.

The data storage part 400 may be driven to sequentially output the 3-rd display data DIDAT<3> and the 4-th display data DIDAT<4> together with the 1-st channel address CHADD<1> and the 2-nd channel address CHADD<2>, respectively, in case that the 2-nd scan address SCADD<2> is generated. Sec t11 in FIG. 3.

For example, in case that the 2-nd scan address SCADD<2> is generated, the data storage part 400 may be driven to first output the 3-rd display data DIDAT<3> together with the 1-st channel address CHADD<1>. Subsequently, the data storage part 400 may output the 4-th display data DIDAT<4> together with the 2-nd channel address CHADD<2>.

The pulse width modulating part 500 may be driven to generate the 1-st modulating signal XMD<1> and the 2-nd modulating signal XMD<2> by modulating the 1-st display data DIDAT<1> and the 2-nd display data DIDAT<2>, which are provided from the data storage part 400, according to the specification of the 1-st scan line SCL<1>, for example, the generation of the 1-st scan address SCADD<1>.

Also, the pulse width modulating part 500 may be driven to generate the 1-st modulating signal XMD<1> and the 2-nd modulating signal XMD<2> by modulating the 3-rd display data DIDAT<3> and the 4-th display data DIDAT<4>, which are provided from the data storage part 400, according to the specification of the 2-nd scan line SCL<2>, for example, the generation of the 2-nd scan address SCADD<2>.

The pulse width modulating part 500 will be described in detail.

Figure 2:
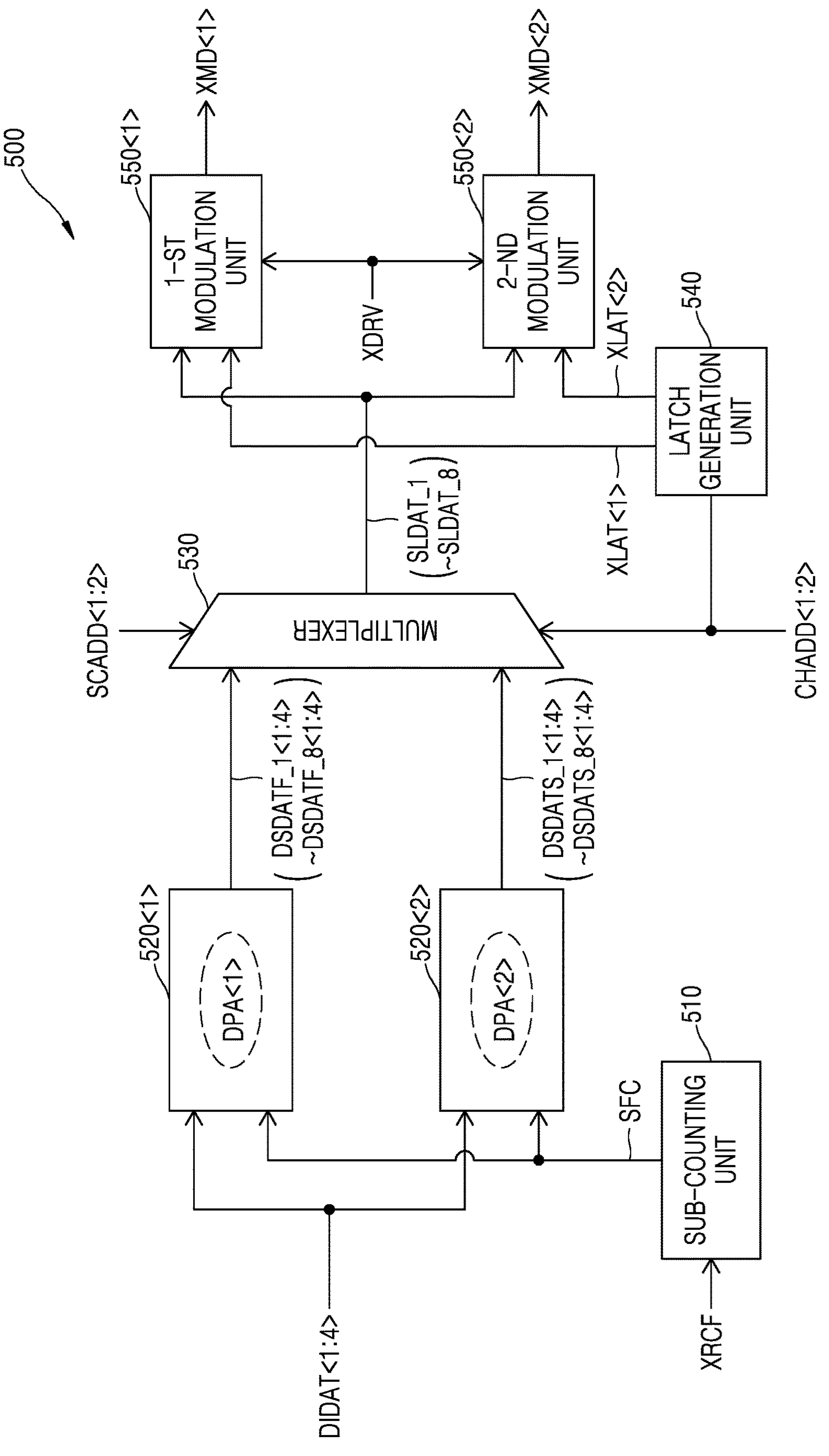
FIG. 2 is a schematic diagram of a pulse width modulating part of FIG. 1.
Figure 3:
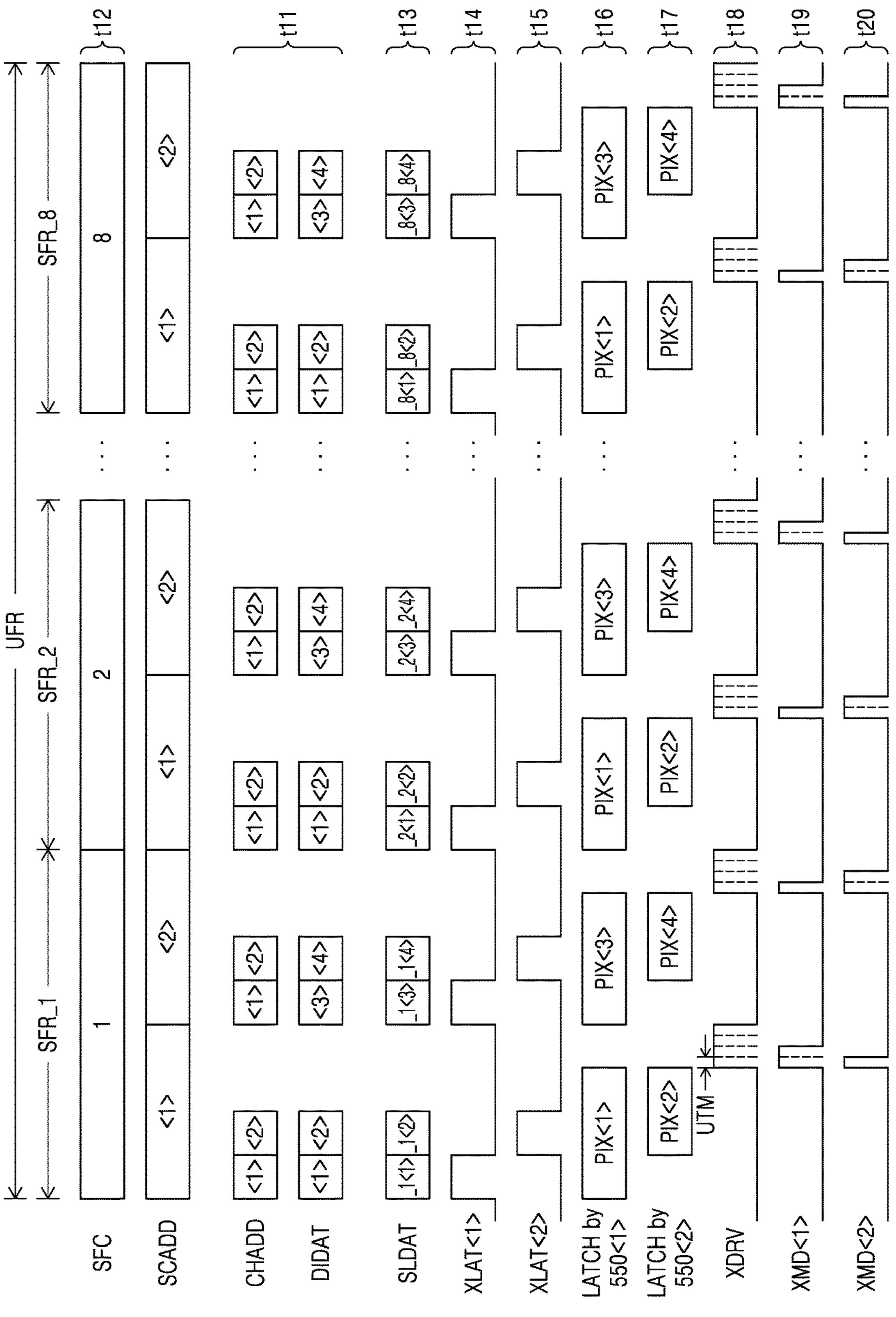
FIG. 3 is a schematic timing diagram for explaining the operation of each component of the pulse width modulating part of FIG. 1.

FIG. 2 is a schematic diagram of the pulse width modulating part 500 of FIG. 1. FIG. 3 is a schematic timing diagram for explaining the operation of each component of the pulse width modulating part 500 of FIG. 1.

Referring to FIG. 2, the pulse width modulating part 500 may include a sub-counting unit 510, a 1-st distribution unit 520<1>, a 2-nd distribution unit 520<2>, a multiplexer 530, a latch generation unit 540, a 1-st modulation unit 550<1> and a 2-nd modulation unit 550<2>.

The sub-counting unit 510 may be driven to generate a sub-counting information SFC. The 1-st to the n-th subframe SFR_1 to SFR_8 in the unit frame UFR may be distinguished by the sub-counting information SFC.

For example, according to the counting information of the sub counting information SFC, the 1-st to the 8-th subframe SFR_1 to SFR_8 may be sequentially processed. See t12 in FIG. 3.

The 1-st distribution unit 520<1> may be driven to generate a 1-st to an 8-th distribution data DSDATF_1<1:4> to DSDATF_8<1:4> of a 1-st distribution type for the 1-st to the 8-th subframe SFR_1 to SFR_8. The 1-st to the 8-th distribution data DSDATF_1<1:4> to DSDATF_8<1:4> of the 1-st distribution type may depend on the 1-st distribution pattern DPA<1> with respect to the 1-st to the 4-th display data DIDAT<1:4>.

The 2-nd distribution unit 520<2> may be driven to generate a 1-st to an 8-th distribution data DSDATS_1<1:4> to DSDATS_8<1:4> of a 2-nd distribution type for the 1-st to the 8-th subframe SFR_1 to SFR_8. The 1-st to the 8-th distribution data DSDATS_1<1:4> to DSDATS_8<1:4> of the 2-nd distribution type may depend on the 2-nd distribution pattern DPA<2> with respect to the 1-st to the 4-th display data DIDAT<1:4>.

The multiplexer 530 may be driven to provide a 1-st to an 8-th selection data SLDAT_1<1:4> to SLDAT_8<1:4> for the 1-st to 4-th display data DIDAT<1:4>. The i-th selection data SLDAT_i<1:4> may be selected according to the channel address CHCADD between the i-th distribution data DSDATF_1<1:4> to DSDATF_8<1:4> of the 1-st distribution type and the i-th distribution data DSDATS_1<1:4> to DSDATS_8<1:4> of the 2-nd distribution type. See t13 in FIG. 3. 'i' may be a natural number between 1 and 8.

According to the channel address CHADD together with the scan address SCADD, the 1-st to the 8-th selection data SLDAT_1<1:4> to SLDAT_8<1:4> for the 1-st to the 4-th display data DIDAT<1:4> are shown in [Table 1].

For example, in case that the 1-st scan address SCADD<1> and the 1-st channel address CHADD<1> are generated, for example, in case that the 1-st light emitting element PIX<1> is specified, the 1-st to the 8-th selection data SLDAT_1<1> to SLDAT_8<1> for the 1-st display data DIDAT<1> may correspond to the 1-st to the 8-th distribution data SDATF_1<1> to DSDATF_8<1> of the 1-st distribution type.

In case that the 1-st scan address SCADD<1> and the 2-nd channel address CHADD<2> are generated, for example, in case that the 2-nd light emitting element PIX<2> is specified, the 1-st to the 8-th selection data SLDAT_1<2> to SLDAT_8<2> for the 2-nd display data DIDAT<2> may correspond to the 1-st to the 8-th distribution data SDATS_1<2> to DSDATS_8<2> of the 2-nd distribution type.

In case that the 2-nd scan address SCADD<2> and the 1-st channel address CHADD<1> are generated, for example, in case that the 3-rd light emitting element PIX<3> is specified, the 1-st to the 8-th selection data SLDAT_1<2> to SLDAT_8<2> for the 3-nd display data DIDAT<3> may correspond to the 1-st to the 8-th distribution data SDATF_1<3> to DSDATF_8<3> of the 1-st distribution type.

In case that the 2-nd scan address SCADD<2> and the 2-nd channel address CHADD<2> are generated, for example, in case that the 4-th light emitting element PIX<4> is specified, the 1-st to the 8-th selection data SLDAT_1<2> to SLDAT_8<2> for the 4-th display data DIDAT<4> may correspond to the 1-st to the 8-th distribution data SDATS_1<4> to DSDATS_8<4> of the 2-nd distribution type.

As a result, the 1-st to the 8-th selection data SLDAT_1<1:4> to SLDAT_8<1:4> for the 1-st to the 4-th display data DIDAT<1:4> in the 1-st to the 8-th subframe SFR_1 to SFR_8 are shown in [Table 2].

TABLE 2

| | SFR_1 | SFR_2 | SFR_3 | SFR_4 |
|---|---|---|---|---|
| DIDAT<1> | DSDATF_1<1> | DSDATF_2<1> | DSDATF_3<1> | DSDATF_4<1> |
| DIDAT<2> | DSDATS_1<2> | DSDATS_2<2> | DSDATS_3<2> | DSDATS_4<2> |
| DIDAT<3> | DSDATS_1<3> | DSDATS_2<3> | DSDATS_3<3> | DSDATS_4<3> |
| DIDAT<4> | DSDATF_1<4> | DSDATF_2<4> | DSDATF_3<4> | DSDATF_4<4> |
| | SFR_5 | SFR_6 | SFR_7 | SFR_8 |
| DIDAT<1> | DSDATF_5<1> | DSDATF_6<1> | DSDATF_7<1> | DSDATF_8<1> |
| DIDAT<2> | DSDATS_5<2> | DSDATS_6<2> | DSDATS_7<2> | DSDATS_8<2> |
| DIDAT<3> | DSDATS_5<3> | DSDATS_6<3> | DSDATS_7<3> | DSDATS_8<3> |
| DIDAT<4> | DSDATF_5<4> | DSDATF_6<4> | DSDATF_7<4> | DSDATF_8<4> |

TABLE 1

| | CHADD<1> | CHADD<2> |
|---|---|---|
| SCADD<1> | DSDATF_1<1> to DSDATF_8<1> | DSDATS_1<2> to DSDATS_8<2> |
| SCADD<2> | DSDATS_1<3> to DSDATS_8<3> | DSDATF_1<4> to DSDATF_8<4> |

Continuously referring to FIG. 2, the latch generation unit 540 may be driven to generate a 1-st latch signal XLAT<1> and a 2-nd latch signal XLAT<1>. The 1-st latch signal XLAT<1> may be activated in response to generation of the 1-st channel address CHADD<1>, and the 2-nd latch signal XLAT<2> may be activated in response to generation of the 2-nd channel address CHADD<2>. See t14 and t15 in FIG. 3.

Those skilled in the art may readily implement the latch generation unit 540. Therefore, in this specification, a detailed description thereof is omitted.

The 1-st modulation unit 550<1> may be driven to latch the 1-st to the 8-th selection data SLDAT_1 to SLDAT_8 according to activation of the 1-st latch signal XLAT<1>.

The 1-st to the 8-th selection data SLDAT_1 to SLDAT_8, which are latched by the 1-st modulation unit 550<1>, may correspond to one selected between the 1-st display data DIDAT<1> and the 3-rd display data DIDAT<3>.

In other words, in case that the 1-st scan address SCADD<1> is generated, the 1-st modulation unit 550<1> may be driven to latch the 1-st to the 8-th selection data SLDAT_1<1> to SLDAT_8<1> corresponding to the 1-st display data DIDAT<1>, for example, the 1-st light emitting element PIX<1>. In case that the 2-nd scan address SCADD<2> is generated, the 1-st modulation unit 550<1> may be driven to latch the 1-st to the 8-th selection data SLDAT_1<3> to SLDAT_8<3> corresponding to the 3-rd display data DIDAT<3>, for example, the 3-rd light emitting element PIX<3>. See t16 in FIG. 3.

The 2-nd modulation unit 550<2> may be driven to latch the 1-st to the 8-th selection data SLDAT_1 to SLDAT_8 according to activation of the 2-nd latch signal XLAT<2>.

The 1-st to the 8-th selection data SLDAT_1 to SLDAT_8, which are latched by the 2-nd modulation unit 550<2>, may correspond to one selected between the 2-nd display data DIDAT<2> and the 4-th display data DIDAT<4>.

In other words, in case that the 2-nd scan address SCADD<2> is generated, the 2-nd modulation unit 550<2> may be driven to latch the 1-st to the 8-th selection data SLDAT_1<2> to SLDAT_8<2> corresponding to the 2-nd display data DIDAT<2>, for example, the 2-nd light emitting element PIX<2>. In case that the 2-nd scan address SCADD<2> is generated, the 2-nd modulation unit 550<2> may be driven to latch the 1-st to the 8-th selection data SLDAT_1<4> to SLDAT_8<4> corresponding to the 4-th display data DIDAT<4>, for example, the 4-th light emitting element PIX<4>. See t17 in FIG. 3.

In case that a driving signal XDRV is activated, the 1-st modulation unit 550<1> may be driven to modify the 1-st to the 8-th selection data SLDAT_1 to SLDAT_8, which are latched according to the activation the 1-st latch signal XLAT<1>, to generate the 1-st modulation signal XMD<1>. See t18 and t19 in FIG. 3. The activation widths of the 1-st modulation signal XMD<1> in the 1-st to the 8-th subframe SFR_1 to SFR_8 may correspond to the data values of the 1-st to the 8-th selection data SLDAT_1 to SLDAT_8.

In case that a driving signal XDRV is activated, the 2-nd modulation unit 550<2> may be driven to modify the 1-st to the 8-th selection data SLDAT_1 to SLDAT_8, which are latched according to the activation the 2-nd latch signal XLAT<2>, to generate the 2-nd modulation signal XMD<2>. See t18 and t20 in FIG. 3. The activation widths of the 2-nd modulation signal XMD<2> in the 1-st to the 8-th subframe SFR_1 to SFR_8 may correspond to the data values of the 1-st to the 8-th selection data SLDAT_1 to SLDAT_8.

According to the display device of the disclosure as described above, the brightness difference among the subframes SFR of the light emitting device PIX forming one group (for example, the 1-st to the 4-th light emitting device PIX<1:4>) may be reduced.

In this regard, an embodiment in which the specific data value is 12 will be described in detail as an example.

In case that the specific data value is 12, it may be difficult that each of the 1-st to the 4-th light emitting elements PIX<1:4> has a same data value in each of the 1-st to the 8-th subframe SFR_1 to SFR_8.

For example, in case that the specific data value is 12, the data value of each of the 1-st to the 4-th light emitting element PIX<1:4> may be 'a' in 4 of the 1-st to the 8-th subframe SFR_1 to SFR_8, and may be 'a+r' in another 4- of the 1-st to the 8-th subframe SFR_1 to SFR_8. 'a' may be an integer greater than or equal to 0, and 'r' may be a natural number greater than or equal to 1.

In the specification, an embodiment that 'a' is 1 and 'r' is 1 is described. For example, in an embodiment, the data value of each of the 1-st to the 4-th light emitting element PIX<1:4> may be 1 in 4 of the 1-st to the 8-th subframe SFR_1 to SFR_8, and may be 2 in another 4 of the 1-st to the 8-th subframe SFR_1 to SFR_8.

In the unit frame UFR, the sum of two of the display data DIDAT for the two of light emitting elements PIX, which are adjacent to each other, may be 24, and the sum of the 1-st to the 4-th display data DIDAT<1:4> for the 1-st to the 4-th light emitting element PIX<1:4> may be 48.

The 1-st to the 8-th distribution data DSDATF_1<1:4> to DSDATF_8<1:4> of the 1-st distribution type, which are output from the 1-st distribution unit 520<1>, are shown in [Table 3].

TABLE 3

| | DSDATF_1 | DSDATF_2 | DSDATF_3 | DSDATF_4 | DSDATF_5 | DSDATF_6 | DSDATF_7 | DSDATF_8 |
|---|---|---|---|---|---|---|---|---|
| DIDAT<1> | 2 | 1 | 2 | 1 | 2 | 1 | 2 | 1 |
| DIDAT<2> | 2 | 1 | 2 | 1 | 2 | 1 | 2 | 1 |
| DIDAT<3> | 2 | 1 | 2 | 1 | 2 | 1 | 2 | 1 |
| DIDAT<4> | 2 | 1 | 2 | 1 | 2 | 1 | 2 | 1 |

For example, the 1-st to the 8-th distribution data DSDATF_1<1> to DSDATF_8<1> of the 1-st distribution type for the 1-st display data DIDAT<1> may be 2,1,2,1,2,1,2,1, and the 1-st to the 8-th distribution data DSDATF_1<2> to DSDATF_8<2> of the 1-st distribution type for the 2-nd display data DIDAT<2> may be 2,1,2,1,2,1,2,1. Also, the 1-st to the 8-th distribution data DSDATF_1<3> to DSDATF_8<3> of the 1-st distribution type for the 3-rd display data DIDAT<3> may be 2,1,2,1,2,1,2,1, and the 1-st to the 8-th distribution data DSDATF_1<4> to DSDATF_8<4> of the 1-st distribution type for the 4-th display data DIDAT<4> may be 2,1,2,1,2,1,2,1.

The 1-st to the 8-th distribution data DSDATS_1<1:4> to DSDATS_8<1:4> of the 2-nd distribution type, which are output from the 2-nd distribution unit 520<2>, are shown in [Table 4].

TABLE 4

| | DSDATS_1 | DSDATS_2 | DSDATS_3 | DSDATS_4 | DSDATS_5 | DSDATS_6 | DSDATS_7 | DSDATS_8 |
|---|---|---|---|---|---|---|---|---|
| DIDAT<1> | 1 | 2 | 1 | 2 | 1 | 2 | 1 | 2 |
| DIDAT<2> | 1 | 2 | 1 | 2 | 1 | 2 | 1 | 2 |
| DIDAT<3> | 1 | 2 | 1 | 2 | 1 | 2 | 1 | 2 |
| DIDAT<4> | 1 | 2 | 1 | 2 | 1 | 2 | 1 | 2 |

For example, the 1-st to the 8-th distribution data DSDATS_1<1> to DSDATS_8<1> of the 2-nd distribution type for the 1-st display data DIDAT<1> may be 1,2,1,2,1, 2,1,2, and the 1-st to the 8-th distribution data DSDATS_1<2> to DSDATS_8<2> of the 1-st distribution type for the 2-nd display data DIDAT<2> may be 1,2,1,2, 1,2,1,2. Also, the 1-st to the 8-th distribution data DSDATS_1<3> to DSDATS_8<3> of the 2-nd distribution type for the 3-rd display data DIDAT<3> may be 1,2,1,2,1, 2,1,2, and the 1-st to the 8-th distribution data DSDATS_1<4> to DSDATS_8<4> of the 2-nd distribution type for the 4-th display data DIDAT<4> may be 1,2,1,2,1, 2,1,2.

Accordingly, the data values of the 1-st to the 8-th selection data SLDAT_1<1:4> to SLDAT_8<1:4>, which are output from the multiplexer 530, are shown in [Table 5].

In other words, in all of the 1-st to the 8-th subframe SFR_1 to SFR_8, the data values of the 1-st to the 8-th selection data SLDAT_1<3> to SLDAT_8<3> corresponding to the 3-rd light emitting element PIX<3> and the data values of the 1-st to the 8-th selection data SLDAT_1<4> to SLDAT_8<4> corresponding to the 4-th light emitting element PIX<4> may be different from each other.

Furthermore, the data values of the 1-st to the 8-th selection data SLDAT_1<1> to SLDAT_8<1> for the 1-st display data DIDAT<1> and the data values of the 1-st to the 8-th selection data SLDAT_1<3> to SLDAT_8<3> for the 3-rd display data DIDAT<3> may be different from each other.

In other words, in all of the 1-st to the 8-th subframe SFR_1 to SFR_8, the data values of the 1-st to the 8-th selection data SLDAT_1<1> to SLDAT_8<1> corresponding to the 1-st light emitting element PIX<1> and the data values of the 1-st to the 8-th selection data SLDAT_1<3> to SLDAT_8<3> corresponding to the 3-rd light emitting clement PIX<3> may be different from each other.

TABLE 5

| | SFR_1 | SFR_2 | SFR_3 | SFR_4 | SFR_5 | SFR_6 | SFR_7 | SFR_8 |
|---|---|---|---|---|---|---|---|---|
| DIDAT<1> | 2 | 1 | 2 | 1 | 2 | 1 | 2 | 1 |
| DIDAT<2> | 1 | 2 | 1 | 2 | 1 | 2 | 1 | 2 |
| DIDAT<3> | 1 | 2 | 1 | 2 | 1 | 2 | 1 | 2 |
| DIDAT<4> | 2 | 1 | 2 | 1 | 2 | 1 | 2 | 1 |

The data values of the 1-st to the 8-th selection data SLDAT_1<1> to SLDAT_8<1> for the 1-st display data DIDAT<1> and the data values of the 1-st to the 8-th th selection data SLDAT_1<2> to SLDAT_8<2> for the 2-nd display data DIDAT<2> may be different from each other.

For example, in a specific subframe, the data value of the selection data SLDAT corresponding to the 1-st light emitting element PIX<1> and the data value of the selection data SLDAT corresponding to the 2-nd light emitting element PIX<2> may be different from each other. The specific subframe may be at least one of the 1-st to the 8-th subframe SFR_1 to SFR_8, and may correspond to all of the 1-st to the 8-th subframe SFR_1 to SFR_8.

In other words, in all of the 1-st to the 8-th subframe SFR_1 to SFR_8, the data values of the 1-st to the 8-th selection data SLDAT_1<1> to SLDAT_8<1> corresponding to the 1-st light emitting element PIX<1> and the data values of the 1-st to the 8-th selection data SLDAT_1<2> to SLDAT_8<2> corresponding to the 2-nd light emitting element PIX<2> may be different from each other.

Also, in case that the 2-nd scan address SCADD<2> is generated, the 1-st to the 8-th selection data SLDAT_1<3> to SLDAT_8<3> for the 3-rd display data DIDAT<3> and the 1-st to the 8-th selection data SLDAT_1<4> to SLDAT_8<4> for the 4-th display data DIDAT<4> may be generated.

The data values of the 1-st to the 8-th selection data SLDAT_1<3> to SLDAT_8<3> for the 3-rd display data DIDAT<3> and the data values of the 1-st to the 8-th selection data SLDAT_1<4> to SLDAT_8<4> for the 4-th display data DIDAT<4> may be different from each other.

Also, in all of the 1-st to the 8-th subframe SFR_1 to SFR_8, the data values of the 1-st to the 8-th selection data SLDAT_1<2> to SLDAT_8<2> for the 2-nd display data DIDAT<2> and the data values of the 1-st to the 8-th selection data SLDAT_1<4> to SLDAT_8<4> for the 4-th display data DIDAT<4> may be different from each other.

In other words, in all of the 1-st to the 8-th subframe SFR_1 to SFR_8, the data values of the 1-st to the 8-th selection data SLDAT_1<2> to SLDAT_8<2> corresponding to the 2-nd light emitting element PIX<2> and the data values of the 1-st to the 8-th selection data SLDAT_1<4> to SLDAT_8<4> corresponding to the 4-th light emitting element PIX<4> may be different from each other.

In summary, in case that the 1-st scan address SCADD<1> is generated, the activation widths of the 1-st modulation signal XMD<1> in the 1-st to the 8-th subframe SFR_1 to SFR_8 may be accorded to the 1-st distribution pattern DPA<1> of the 1-st display data DIDAT<1>. Also, in case that the 2-nd scan address SCADD<2> is generated, the activation widths of the 1-st modulation signal XMD<1> in the 1-st to the 8-th subframe SFR_1 to SFR_8 may be accorded to the 2-nd distribution pattern DPA<2> of the 3-rd display data DIDAT<3>. See t19 in FIG. 3.

Also, in case that the 1-st scan address SCADD<1> is generated, the activation widths of the 2-nd modulation signal XMD<2> in the 1-st to the 8-th subframe SFR_1 to SFR_8 may be accorded to the 2-nd distribution pattern DPA<2> of the 2-nd display data DIDAT<2>. Also, in case that the 2-nd scan address SCADD<2> is generated, the activation widths of the 2-nd modulation signal XMD<2> in the 1-st to the 8-th subframe SFR_1 to SFR_8 may be accorded to the 1-st distribution pattern DPA<1> of the 4-th display data DIDAT<4>. See t20 in FIG. 3.

As a result, in case that the 1-st scan address SCADD<1> is generated, even in case that the data value of the 1-st display data DIDAT<1> and the data value of the 2-nd display data DIDAT<2> are same, the activation width of the 1-st modulation signal XMD<1> and the activation width of the 2-nd modulated signal XMD<2> may be different from each other in a specific subframe that is at least one of the 1-st to the 8-th subframe SFR_1 to SFR_8.

In case that the 2-nd scan address SCADD<2> is generated, even in case that the data value of the 3-rd display data DIDAT<3> and the data value of the 4-th display data DIDAT<4> are same, the activation width of the 1-st modulation signal XMD<1> and the activation width of the 2-nd modulated signal XMD<2> may be different from each other in the 1-st to the 8-th subframe SFR_1 to SFR_8.

Even in case that the data value of the 1-st display data DIDAT<1> and the data value of the 3-rd display data DIDAT<3> are same, the activation width of the 1-st modulation signal XMD<1> in generation of the 1-st scan address SCADD<1> and the activation width of the 1-st modulation signal XMD<1> in generation of the 2-nd scan address SCADD<2> may be different from each other in the 1-st to the 8-th subframe SFR_1 to SFR_8.

Even in case that the data value of the 2-nd display data DIDAT<2> and the data value of the 4-th display data DIDAT<4> are same, the activation width of the 2-nd modulation signal XMD<2> in generation of the 1-st scan address SCADD<1> and the activation width of the 2-nd modulation signal XMD<2> in generation of the 2-nd scan address SCADD<2> may be different from each other in the 1-st to the 8-th subframe SFR_1 to SFR_8.

In other words, in the display device of the disclosure, even in case that adjacent light emitting elements PIX have display data DIDAT of the same data value, the adjacent light emitting elements PIX may emit light with brightness according to different distribution patterns in a specific subframe SFR.

According to the display device of the disclosure as described above, in each of the 1-st to the 8-th subframe SFR_1 to SFR_8, the sum of the data values of the selection data for two adjacent light emitting elements PIX may be 3, which is the same.

Figure 4:
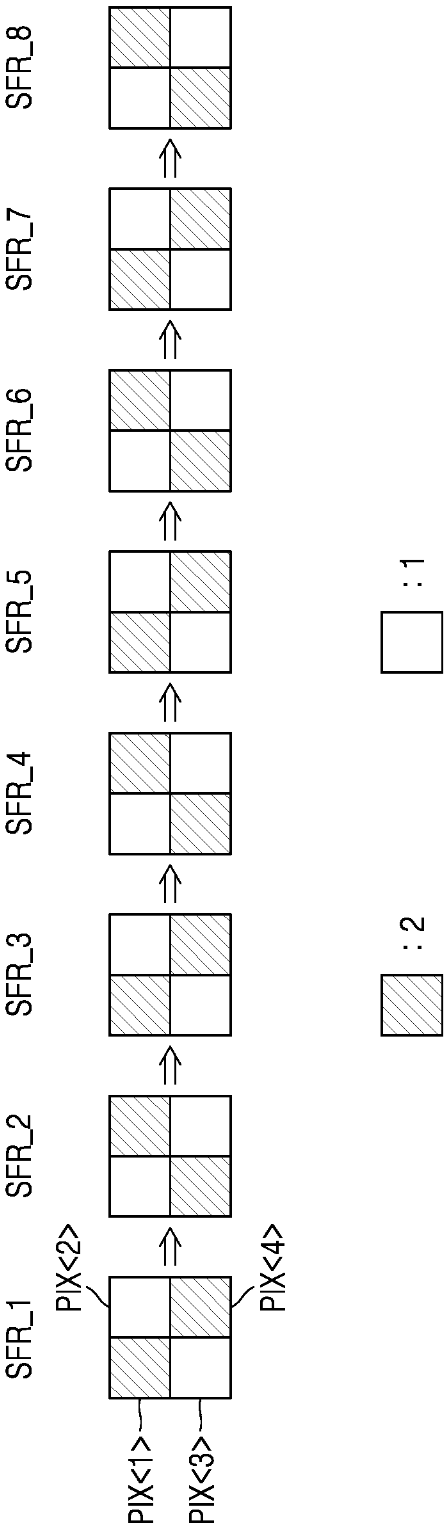
FIG. 4 is a schematic diagram for explaining the effect of the disclosure.

This means that 24, which is the sum of data values of display data for two adjacent light emitting elements in the unit frame UFR, may be equally distributed with 3 in each of the 1-st to the 8-th subframe SFR_1 to SFR_8, as shown in FIG. 4.

In each of the 1-st to the 8-th subframe SFR_1 to SFR_8, the sum of the data values of the selection data for four adjacent light emitting elements PIX may be 6, which is the same.

This means that 48, which is the sum of data values of display data for four adjacent light emitting elements in the unit frame UFR, may be equally distributed with 6 in each of the 1-st to the 8-th subframe SFR_1 to SFR_8, as shown in FIG. 4.

In the display device of the disclosure as described above, as shown in FIG. 4, the difference among the subframes SFR of the sum of the brightness of two or four light emitting elements PIX forming one group may be reduced.

As a result, according to the display device of the disclosure, the flicker phenomenon may be alleviated.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A display device comprising:

a display panel including a 1-st to a 4-th light emitting element forming one group, a 1-st scan line and a 2-nd scan line adjacent to each other, and a 1-st channel line and a 2-nd channel line adjacent to each other, wherein the 1-st light emitting element is connected to the 1-st scan line and the 1-st channel line, the 2-nd light emitting element is connected to the 1-st scan line and the 2-nd channel line, the 3-rd light emitting element is connected to the 2-nd scan line and the 1-st channel line, and the 4-th light emitting element is connected to the 2-nd scan line and the 2-nd channel line, each of the 1-st to the 4-th light emitting element emits light with brightness according to a total amount of current flowing therein during a unit frame, the unit frame includes a 1-st to an n-th subframe which are sequentially progressed, and each of the 1-st to the n-th subframe includes 'p' number of a unit time, 'n' is a natural number greater than or equal to 2, and 'p' is a natural number greater than or equal to 1;

a scan driving part that is driven to selectively activate the 1-st scan line and the 2-nd scan line according to a scan address which is sequentially changed, wherein the 1-st scan line and the 2-nd scan line are activated non-overlappingly and sequentially in each of the 1-st to the n-th subframe;

a channel driving part that is driven to transmit current to flow in the 1-st channel line and the 2-nd channel line for a time corresponding to an activation width of a 1-st modulation signal and an activation width of a 2-nd modulation signal;

a data storage part that stores a 1-st to a 4-th display data corresponding to the 1-st to the 4-th light emitting element, wherein the 1-st display data and the 2-nd display data are sequentially output together with a channel address specifying corresponding 1-st and 2-nd channel line according to a generation of a 1-st scan address which is the scan address specifying the 1-st scan line, and the 3-rd display data and the 4-th display data are sequentially output together with a channel address specifying corresponding 1-st and 2-nd channel line according to a generation of a 2-nd scan address which is the scan address specifying the 2-nd scan line; and a pulse width modulating part that is driven to generate a 1-st modulating signal and a 2-nd modulating signal by modulating the 1-st display data and the 2-nd display data provided from the data storage part according to the generation of the 1-st scan address, wherein the 1-st modulation signal is activated in the 1-st to the n-th subframe with an activation width corresponding to a 1-st distribution pattern of the 1-st display data in case that the 1-st scan address is generated, and the 2-nd modulation signal is activated in the 1-st to the n-th subframe with an activation width corresponding to a 2-nd distribution pattern of the 2-nd display data in case that the 1-st scan address is generated, wherein the activation width of the 1-st modulation signal and the activation width of the 2-nd modulation signal are different from each other with respect to the 1-st display data and the 2-nd display data having a specific data value in a specific subframe that is at least one of the 1-st to the n-th subframe in case that the 1-st scan address is generated.

2. The display device of claim 1, wherein with respect to the 1-st display data and the 2-nd display data having the specific data value in the specific subframe that is at least one of the 1-st to the n-th subframe in case that the 1-st scan address is generated the activation width of the 1-st modulation signal corresponds to 'a' number of the unit time, the activation width of the 2-nd modulation signal correspond to 'a+r' number of the unit time, 'a' is an integer in a range of 0 to (p-1), and 'r' is a natural number greater than or equal to 1.

3. The display device of claim 2, wherein the pulse width modulating part is driven to generate the 1-st modulating signal and the 2-nd modulating signal by modulating the 3-rd display data and the 4-th display data provided from the data storage part according to the generation of the 2-nd scan address, the 1-st modulating signal is activated in the 1-st to the n-th subframe with an activation width corresponding to the 2-nd distribution pattern of the 3-rd display data in case that the 2-nd scan address is generated, the 2-nd modulating signal is activated in the 1-st to the n-th subframe with an activation width corresponding to the 1-st distribution pattern of the 4-th display data in case that the 2-nd scan address is generated, and the activation width of the 1-st modulation signal and the activation width of the 2-nd modulation signal are different from each other with respect to the 3-rd display data and the 4-th display data having the specific data value in the specific subframe in case that the 2-nd scan address is generated.

4. The display device of claim 3, wherein with respect to the 3-rd display data and the 4-th display data having the specific data value in the specific subframe when the 2-nd scan address is generated the activation width of the 1-st modulation signal corresponds to 'a+r' number of the unit time, and the activation width of the 2-nd modulation signal corresponds to 'a' number of the unit time.

5. The display device of claim 3, wherein the data storage part includes a SRAM that stores the 1-st to the 4-th display data provided from an outside.

6. A display device comprising:

a display panel including a 1-st to a 4-th light emitting element forming one group, a 1-st scan line and a 2-nd scan line adjacent to each other, and a 1-st channel line and a 2-nd channel line adjacent to each other, wherein the 1-st light emitting element is connected to the 1-st scan line and the 1-st channel line, the 2-nd light emitting element is connected to the 1-st scan line and the 2-nd channel line, the 3-rd light emitting element is connected to the 2-nd scan line and the 1-st channel line, and the 4-th light emitting element is connected to the 2-nd scan line and the 2-nd channel line, each of the 1-st to the 4-th light emitting element emits light with brightness according to a total amount of current flowing therein during a unit frame, the unit frame includes a 1-st to an n-th subframe which are sequentially progressed, and each of the 1-st to the n-th subframe includes 'p' number of a unit time, 'n' is a natural number greater than or equal to 2, and 'p' is a natural number greater than or equal to 1;

a scan driving part that is driven to selectively activate the 1-st scan line and the 2-nd scan line according to a scan address which is sequentially changed, wherein the 1-st scan line and the 2-nd scan line are activated non-overlappingly and sequentially in each of the 1-st to the n-th subframe;

a channel driving part that is driven to transmit current to flow in the 1-st channel line and the 2-nd channel line for a time corresponding to an activation width of a 1-st modulation signal and an activation width of a 2-nd modulation signal;

a data storage part that stores a 1-st to a 4-th display data corresponding to the 1-st to the 4-th light emitting element, wherein the 1-st display data and the 2-nd display data are sequentially output together with a channel address specifying corresponding 1-st and 2-nd channel line according to a generation of a 1-st scan address which is the scan address specifying the 1-st scan line, and the 3-rd display data and the 4-th display data are sequentially output together with a channel address specifying corresponding 1-st and 2-nd channel line according to a generation of a 2-nd scan address which is the scan address specifying the 2-nd scan line; and a pulse width modulating part that is driven to generate a 1-st modulating signal and a 2-nd modulating signal by modulating the 1-st display data and the 2-nd display data provided from the data storage part according to the generation of the 1-st scan address, and generate the 1-st modulating signal and the 2-nd modulating signal by modulating the 3-rd display data and the 4-th display data provided from the data storage part according to the generation of the 2-nd scan address, wherein the 1-st modulation signal is activated in the 1-st to the n-th subframe with the activation width corresponding to a 1-st distribution pattern of the 1-st display data in case that the 1-st scan address is generated, and the activation width corresponding to a 2-nd distribution pattern of the 3-rd display data in case that the 2-nd scan address is generated, and the activation width of the 1-st modulation signal in case that the 1-st scan address is generated and the activation width of the 1-st modulation signal in case that the 2-nd scan address is generated are different from each other with respect to the 1-st display data and the 3-rd display data having a specific data value in a specific subframe that is at least one of the 1-st to the n-th subframe.

7. The display device of claim 6, wherein the activation width of the 1-st modulation signal corresponds to 'a' number of the unit time with respect to the 1-st display data having the specific data value in the specific subframe in case that the 1-st scan address is generated, the activation width of the 1-st modulation signal corresponds to 'a+r' number of the unit time with respect to the 3-rd display data having the specific data value in the specific subframe in case that the 2-nd scan address is generated, 'a' is an integer in a range of 0 to (p-1), and 'r' is a natural number greater than or equal to 1.

* * * * *